(12) United States Patent
George et al.

(10) Patent No.: US 6,923,419 B2
(45) Date of Patent: Aug. 2, 2005

(54) APPLIANCE WITH INTEGRATED, VERTICALLY ADJUSTABLE PLATFORM

(75) Inventors: Evelyn M. George, Newton, IA (US); Mostafa Michael Khosropour, Newton, IA (US)

(73) Assignee: Maytag Corporation, Newton, IA (US)

(*) Notice: Subject to any disclaimer, the term of this patent is extended or adjusted under 35 U.S.C. 154(b) by 61 days.

(21) Appl. No.: 10/446,679

(22) Filed: May 29, 2003

(65) Prior Publication Data

US 2004/0238716 A1 Dec. 2, 2004

(51) Int. Cl.[7] ............................................. E04G 3/00
(52) U.S. Cl. .................... 248/676; 248/188.4; 248/649; 280/638
(58) Field of Search .......................... 280/638; 248/676, 248/677, 678, 649, 346.03, 346.05, 346.11, 188.4; 312/351.1, 351.2

(56) References Cited

U.S. PATENT DOCUMENTS

| 3,102,648 A | * | 9/1963 | Hughes ...................... 414/449 |
| 3,750,989 A | | 8/1973 | Bergeson |
| 3,836,162 A | | 9/1974 | Felkner |
| 3,844,578 A | | 10/1974 | Matyskella et al. |
| 3,856,248 A | | 12/1974 | Labelle |
| 3,858,270 A | | 1/1975 | Crowe |
| 3,918,733 A | | 11/1975 | Macho et al. |
| 4,124,187 A | | 11/1978 | Webb |
| 4,166,638 A | * | 9/1979 | De Prado ................... 280/638 |
| 4,955,569 A | | 9/1990 | Hottmann |
| 4,984,814 A | * | 1/1991 | Graffunder ................... 280/35 |
| 5,451,028 A | * | 9/1995 | Lietti .......................... 248/676 |
| 5,622,350 A | * | 4/1997 | Vande Haar ................ 248/677 |
| 5,785,293 A | * | 7/1998 | Ford et al. .................. 248/649 |
| 5,971,408 A | | 10/1999 | Mandel et al. |
| 6,585,225 B1 | * | 7/2003 | Lake .......................... 248/678 |

FOREIGN PATENT DOCUMENTS

JP 2001-50642 2/2001

* cited by examiner

*Primary Examiner*—Ramon O Ramirez
(74) *Attorney, Agent, or Firm*—Diederiks & Whitelaw, PLC; Allan P. Orsund

(57) ABSTRACT

An adjustable platform assembly for raising an appliance includes a platform with various spaced vertical leg members. Each of the leg members has a first mounting aperture for fixing an appliance to the platform, and a second mounting aperture for fixing an adjustable caster to the leg member. A consumer can adjust the platform assembly to a desired height by altering the height of the caster members. A decorative faceplate is provided which removably attaches to the front of the platform assembly to give the appliance a built-in look.

20 Claims, 3 Drawing Sheets

APPLIANCE WITH INTEGRATED, VERTICALLY ADJUSTABLE PLATFORM

BACKGROUND OF THE INVENTION

1. Field of the Invention

The present invention pertains to the art of appliances and, more particularly, a vertically adjustable wheeled platform assembly adapted to support an appliance cabinet, such as a refrigerator.

2. Discussion of the Prior Art

Many types of appliances are commonly found in domestic households. These appliances include clothes washers and dryers, dishwashers, ranges and refrigerators. In the case of the latter, there exist various styles of refrigerators on the market. Most common are side-by-side, top mount, and bottom mount models. In a side-by-side model, fresh food and freezer compartments are arranged laterally adjacent one another. A top mount refrigerator includes an upper freezer compartment and a lower fresh food compartment. Finally, bottom mount models have the fresh food compartment located above the freezer compartment. One advantage of the bottom mount design is the ability of the consumer to view the contents of the fresh food compartment without having to bend over or stoop. However, it may still be desirable to adjust the height of the refrigerator to reduce the amount of bending or kneeling required to access portions of the freezer compartment or to simply further raise the shelving of the fresh food compartment.

In the art of household appliances in general, it has become customary to equip heavy domestic appliances with wheel assemblies or casters to enhance the mobility of the appliances. Often, it is also desirable to permit some degree of vertical adjustability between the appliance cabinet and the surface upon which the wheel assemblies are supported for leveling the appliance. One example of such a vertically adjustable wheel assembly is shown in U.S. Pat. No. 5,971,408. Typical supports for refrigerators are adjustable only to the extent of allowing for leveling of the appliance and are not intended to act as overall height adjustment devices for refrigerator cabinets.

Based on the above, there exists a need in the art for a raised platform assembly for an appliance, particularly a bottom mount refrigerator, which can readily take the place of other leveling and/or moving hardware, and that has the advantages of vertically adjustable wheels for supporting the appliance.

SUMMARY OF THE INVENTION

The present invention is directed to an integrated raised appliance platform. More specifically, a raised platform for an appliance, preferably a refrigerator and, most preferably, a bottom mount refrigerator, includes four leg members with adjustable casters and mounting apertures. After any factory installed leveling and/or moving hardware is detached from brackets on the bottom of the appliance, fasteners can be extended through the brackets and into the mounting apertures in the platform assembly to fix the platform assembly to the bottom of the appliance. The casters can be adjusted to customize the height of the overall appliance/platform assembly. Preferably, a decorative faceplate is removably attached to the front facing side of the appliance/platform assembly in order to match or blend the platform assembly to any surrounding cabinetry.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
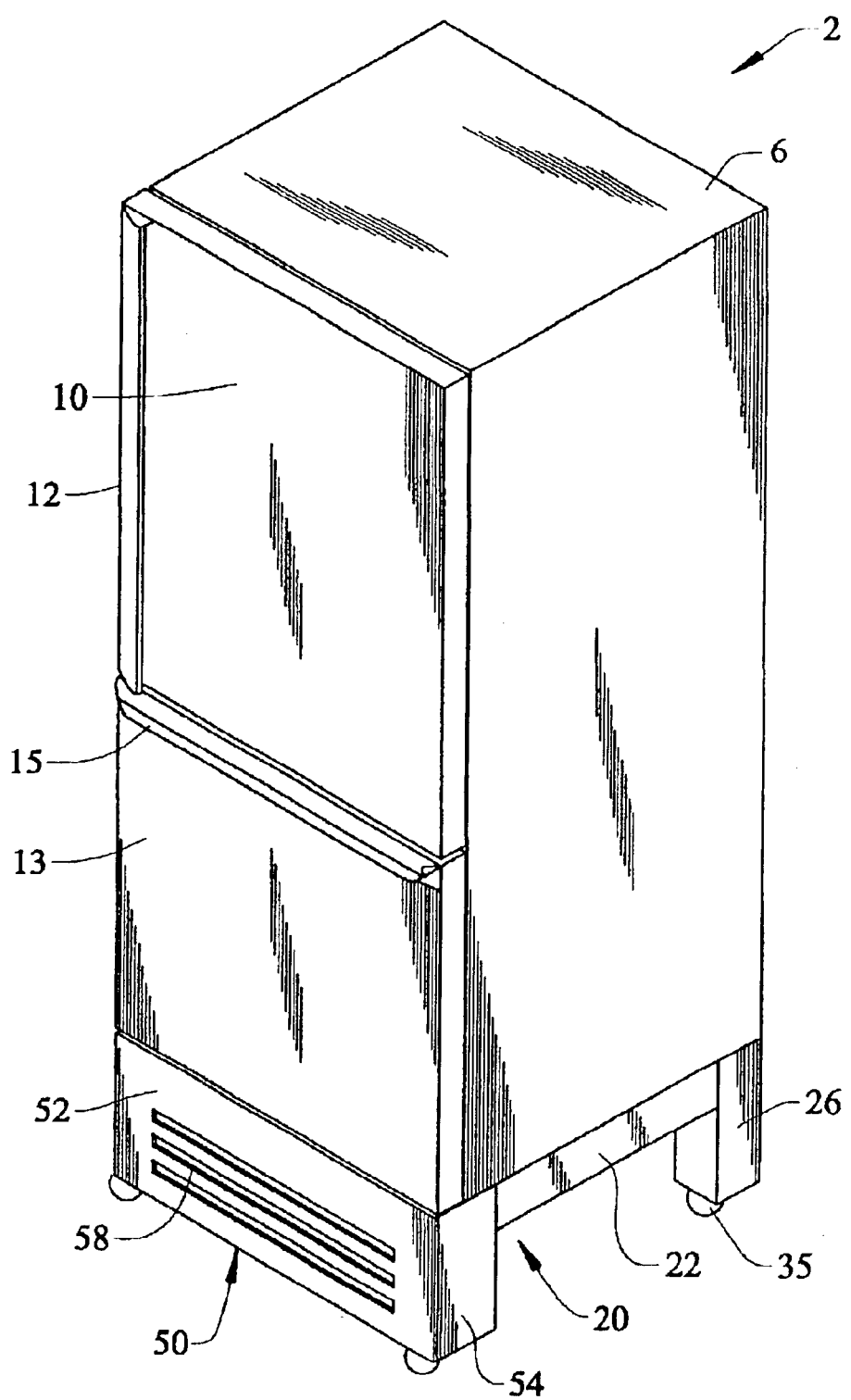
FIG. 1 is a perspective view of a refrigerator/platform assembly constructed in accordance with the present invention.

With initial reference to FIG. 1, a refrigerator is generally indicated at 2. Refrigerator 2 includes a cabinet shell 6 to which is attached a fresh food compartment door 10. At this point, it should be readily recognized that refrigerator 2 constitutes a bottom mount style refrigerator wherein fresh food compartment door 10 is adapted to seal off an upper fresh food compartment (not shown) defined within cabinet shell 6. In a manner known in the art, fresh food compartment door 10 is preferably, pivotally mounted about a vertical axis to cabinet shell 6 through upper and lower hinges (not shown). A substantially vertically extending handle 12 is mounted along one front side portion of refrigerator 2 for opening fresh food compartment door 10. Refrigerator 2 also includes a lower freezer compartment door 13. Freezer compartment door 13 preferably includes a horizontally extending handle 15 for use in sliding freezer compartment door 13 relative to cabinet shell 6. To this point, the above-described general structure associated with refrigerator 2 is known in the art and is presented only for the sake of completeness. The present invention is actually directed to a raised platform assembly generally indicated at 20.

Figure 2:
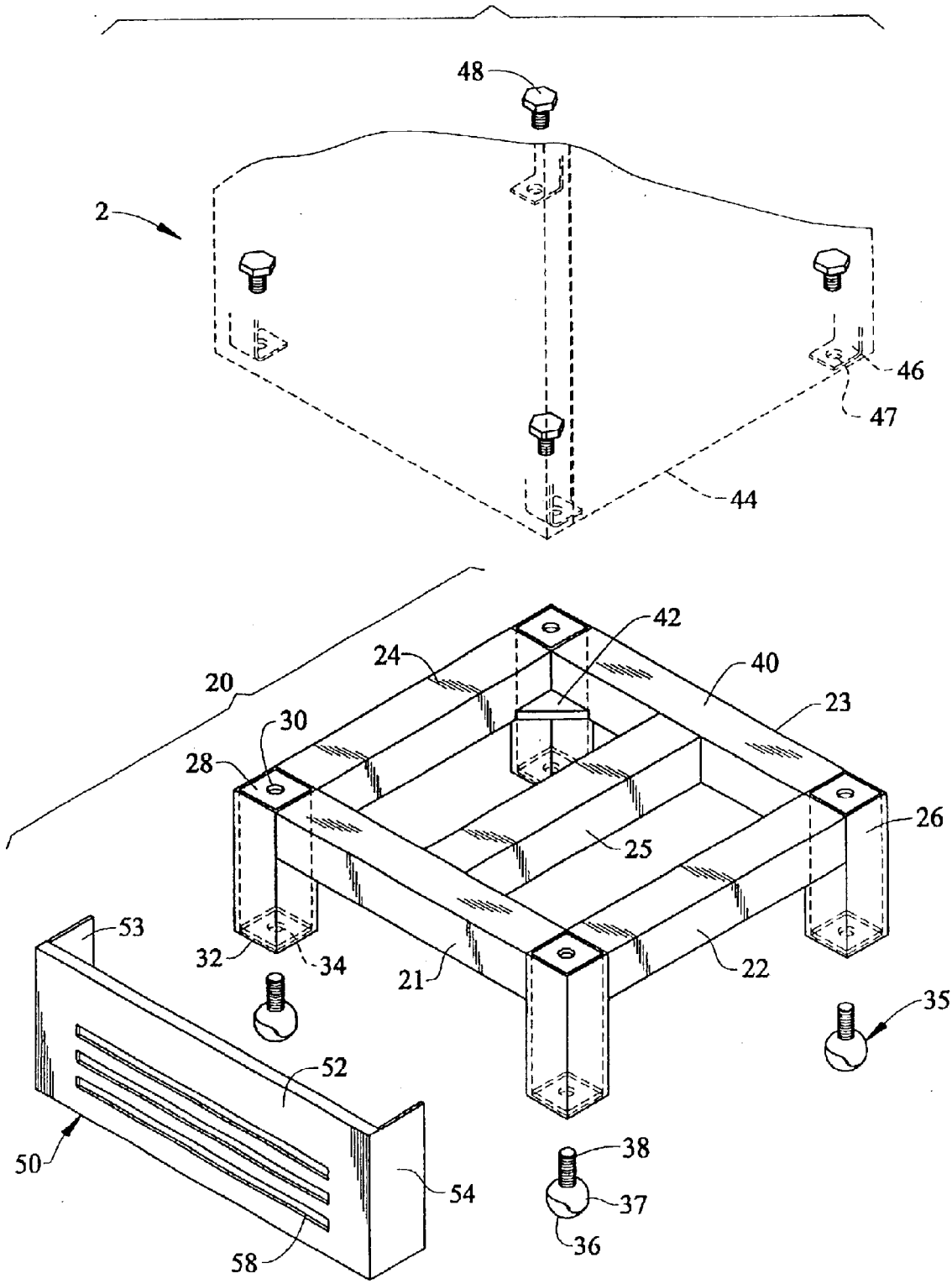
FIG. 2 is an exploded view of the platform assembly of the invention, with a portion of a refrigerator shown in phantom to illustrate mounting structure between the refrigerator and the platform assembly.
Figure 3:
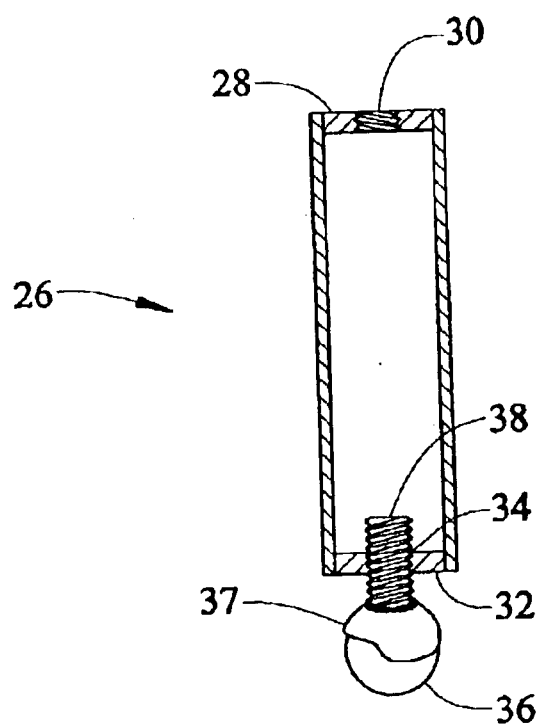
FIG. 3 is a cross-sectional view of one leg member of the platform assembly of the invention.

Reference will now be made to FIG. 2 in describing the preferred construction of platform assembly 20 and the manner in which platform assembly 20 and refrigerator 2 are interconnected. Platform assembly 20 preferably includes four frame members 21–24 and a reinforcing cross frame member 25. Frame members 21–25 can be any type of suitable material for supporting a refrigerator, such as square steel tubing. Additionally, platform assembly 20 includes four legs 26. Each leg 26 includes an upper end plate 28 provided with a first threaded mounting aperture 30, and a lower end plate 32 formed with a second threaded mounting aperture 34. Platform assembly 20 also includes four adjustable roller members, preferably in the form of casters 35. Each caster 35 includes a roller ball 36, a support cup member 37, and a mounting stud 38. In accordance with the most preferred embodiment of the invention, each caster 35 is vertically, adjustably interconnected to the bottom end plate 32 of a respective leg 26, with mounting stud 38 being threaded into a corresponding second mounting aperture 34. In this manner, mounting stud 38 can be threaded into a respective leg 26 a desired amount in order to establish a requisite height for frame members 21–24 relative to a supporting surface.

In accordance wit the most preferred embodiment, frame members 21–24 and legs 26 are made from steel tubing which are welded together to establish a substantially planar upper support surface 40. Various, gussets, one of which is shown at 42, are preferably welded at the interconnection of respective ones of frame member 21–24 to provide additional strength to platform assembly 20 for supporting refrigerator 2. Upper end plate 28 preferably constitutes a 10 gauge metal plate which is welded to steel tubing leg 26. Additionally, bottom end plate 32 is also preferably constituted by a 10 gauge metal plate which is welded to the bottom side of a respective one of legs 26. This preferred construction is considered to provide adequate strength and stability to platform assembly 20 for bearing the substantial weight of refrigerator 2. Of course, casters 36 function to distribute the weight of refrigerator 2 and platform assembly 20 in such way that damage to flooring is avoided.

Support surface 40 of platform assembly 20 is sized to accommodate refrigerator 2. To this end, as shown best in FIG. 2, refrigerator cabinet 6 includes a bottom end 44 provided with a plurality of fastening brackets 46, each of which has an associated hole 47. In general, brackets 46 are of the type associated with conventional leg levelers (not shown). Before mounting refrigerator 2 upon platform assembly 20, any factory installed leveling and/or moving hardware (not shown) is detached from fastening brackets 46 and removed from refrigerator 2. Thereafter, bottom end 44 of cabinet 6 is placed upon support surface 40 of platform assembly 20 such that holes 47 of fastening brackets 46 are aligned with the first mounting apertures 30 in platform assembly 20. Fasteners 48 are extended through holes 47 in fastening brackets 46 and threaded into a respective first mounting apertures 30, thereby fixing refrigerator 2 upon platform assembly 20. Fasteners 48 are preferably constituted by threaded bolts, but can be any equivalent fastening means. Once refrigerator 2 is secured to platform assembly 20, a decorative faceplate 50, including a front face portion 52 and side wall portions 53 and 54, is placed against the front legs 26 of platform assembly 20, while side wall portions 53 and 54 extend about the front legs 26. Decorative faceplate 50 can be made of wood, plastic, or any other decorative material that can be matched to existing wood or laminate cabinet fixtures adjacent refrigerator 2. Preferably, decorative faceplate 50 extends to directly beneath freezer door 13 as shown in FIG. 1. This arrangement provides a more built-in look for refrigerator 2 and platform assembly 20. Decorative faceplate 50 can be attached using any known type of fastening means, including adhesive strips, mechanical fasteners or the like (not shown). Decorative faceplate 50 preferably includes vents 58, which allow for air circulation under refrigerator 2.

With this arrangement, refrigerator 2 can be lifted to a more accessible height, generally in the order of 15 inches (38 cm) in the most preferred embodiment with a bottom mount style refrigerator 2 having a freezer height in the order of 24 inches (61 cm) and a fresh food compartment height of approximately 37 inches (94 cm), with the height being fine-tuned through the use of casters 35. At the same time, refrigerator 2 can be leveled through casters 35 for proper operation. In any event, although described with reference to a preferred embodiment of the invention, it should be readily understood that various changes and/or modifications can be made to the invention without departing from the spirit thereof. For instance, instead of having a plurality of separate fastening brackets 46, cabinet 6 could simply have a bottom plate which sits upon supporting surface 40 and which receives fasteners 48. In addition, various other types of mounting arrangements could be employed. Furthermore, although refrigerator 2 is shown mounted on platform assembly 20, it is understood that this invention could be useful for supporting other types of appliances, such as raising a conventional clothes washer, clothes dryer or range, for enhanced use by a taller than average person. In general, the invention is only intended to be limited by the scope of the following claims.

We claim:

1. A domestic appliance comprising:

a cabinet having a bottom end;

a platform assembly for supporting the cabinet in an elevated, substantially stationary position during use of the appliance, said platform assembly including a plurality of frame members which define a supporting surface upon which the cabinet is positioned, a plurality of upstanding leg members having upper end portions secured to the plurality of frame members and lower end portions, and a plurality of roller members, each of the plurality of roller members being vertically, adjustably attached to a respective one of the lower end portions of the plurality of upstanding leg members;

fastening means for fastening the bottom end of the cabinet to the platform assembly thereby fixing the cabinet upon the supporting surface in a raised condition; and a decorative faceplate secured across a front portion of said platform assembly.

2. The domestic appliance according to claim 1, wherein the plurality of frame members constitute tubular members extending between the upper end portions of respective ones of said plurality of leg members, said platform assembly further including a cross frame member extending between two of the plurality of frame members.

3. The domestic appliance according to claim 1, wherein each one of said plurality of roller members constitutes a caster.

4. The domestic appliance according to claim 3, wherein each caster includes a threaded mounting stud, a support cup member and a roller ball.

5. The domestic appliance according to claim 1, wherein said decorative faceplate includes a front face portion extending across a front of the platform assembly, and side wall portions extending along side portions of the platform assembly.

6. The domestic appliance according to claim 5, wherein the front face portion of said decorative faceplate includes various vents.

7. The domestic appliance according to claim 1, wherein the appliance constitutes a refrigerator.

8. The domestic appliance according to claim 7, wherein the refrigerator constitutes a bottom mount style refrigerator.

9. A domestic appliance comprising:

a cabinet having a bottom end, wherein the bottom end of the cabinet is formed with a plurality of holes;

a platform assembly for supporting the cabinet in an elevated position, said platform assembly including a plurality of frame members which define a supporting surface upon which the cabinet is positioned, a plurality of upstanding leg members having upper end portions which are secured to the plurality of frame members and lower end portions, and a plurality of roller members, each of the plurality of roller members being vertically, adjustably attached to a respective one of the lower end portions of the plurality of upstanding leg members;

means for fastening the bottom end of the cabinet to the platform assembly thereby fixing the cabinet upon the supporting surface in a raised condition, said fastening means including a plurality of fasteners extending through the plurality of holes and being secured to the platform assembly; and a decorative faceplate secured across a front portion of said platform assembly.

10. The domestic appliance according to claim 9, wherein the bottom end of the cabinet includes a plurality of spaced brackets, each one of the plurality of holes being formed in a respective one of the plurality of brackets.

11. The domestic appliance according to claim 9, wherein the plurality of fasteners extend through the plurality of holes and are threadably secured to the platform assembly.

12. The domestic appliance according to claim 11, wherein the upper end portion of each of the plurality of leg members includes an upper end plate provided with a threaded aperture which receives a respective one of the plurality of fasteners.

13. The domestic appliance according to claim 12, wherein the lower end portion of each of the plurality of leg members includes a lower end plate provided with a threaded opening which adjustably, threadably receives a respective one of the plurality of roller members.

14. A method of raising and supporting a cabinet of a domestic appliance comprising:

detaching any leg leveling elements from leg leveling support structure provided on a bottom end of the cabinet;

positioning the bottom end of the cabinet of the domestic appliance upon a plurality of frame members supported by a plurality of leg members of an overall platform assembly;

fastening the cabinet upon the platform assembly through the leg leveling support structure; and positioning a front faceplate across the platform assembly.

15. The method of claim 14, further comprising: securing the domestic appliance upon the platform assembly with a plurality of fasteners extending through the leg leveling support structure on the bottom end of the cabinet and into the platform assembly.

16. The method of claim 15, wherein leg leveling support structure provided on the bottom end of the cabinet is defined by a plurality of brackets including openings, said domestic appliance being fastened upon the platform assembly with the plurality of fasteners extending through the openings and being threaded into the platform assembly.

17. The method of claim 15, further comprising: altering a height of the platform assembly by vertically adjusting casters attached to the plurality of leg members supporting the platform assembly.

18. The method of claim 17, further comprising: securing the plurality of fasteners to upper end plates of the plurality of leg members and attaching the casters to lower end plates of the plurality of leg members.

19. The method of claim 14, further comprising: extending the decorative faceplate across both a front portion and side portions of the platform assembly.

20. The method of claim 19, further comprising: venting below the domestic appliance through the decorative faceplate.

* * * * *